(12) United States Patent
LeGrand, III et al.

(10) Patent No.: US 9,137,511 B1
(45) Date of Patent: Sep. 15, 2015

(54) 3D MODELING WITH DEPTH CAMERA AND SURFACE NORMALS

(75) Inventors: Louis L. LeGrand, III, Seattle, WA (US); Christopher Coley, Morgan Hill, CA (US); William Spencer Worley, III, Half Moon Bay, CA (US); Edward Dietz Crump, Santa Cruz, CA (US)

(73) Assignee: Rawles LLC, Wilmington, DE (US)

( * ) Notice: Subject to any disclaimer, the term of this patent is extended or adjusted under 35 U.S.C. 154(b) by 923 days.

(21) Appl. No.: 13/327,203

(22) Filed: Dec. 15, 2011

(51) Int. Cl.
*H04N 13/02* (2006.01)
*H04N 13/00* (2006.01)
*G06T 19/00* (2011.01)

(52) U.S. Cl.
CPC .......... *H04N 13/0022* (2013.01); *G06T 19/006* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 5,930,383 A | * | 7/1999 | Netzer | 382/154 |
| 5,995,758 A | * | 11/1999 | Tyler | 396/13 |
| 2001/0052985 A1 | * | 12/2001 | Ono | 356/614 |
| 2002/0158872 A1 | * | 10/2002 | Randel | 345/426 |
| 2004/0151369 A1 | * | 8/2004 | Schwotzer | 382/154 |
| 2005/0018209 A1 | * | 1/2005 | Lemelin et al. | 356/604 |
| 2008/0279446 A1 | * | 11/2008 | Hassebrook et al. | 382/154 |
| 2009/0304299 A1 | * | 12/2009 | Motomura et al. | 382/254 |
| 2010/0194862 A1 | * | 8/2010 | Givon | 348/49 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Sath V Perungavoor
*Assistant Examiner* — Peter D Le
(74) *Attorney, Agent, or Firm* — Lee & Hayes, PLLC

(57) ABSTRACT

Devices and techniques are described for generating three-dimensional (3D) models of objects. Depth data acquired from a depth camera system is used with data about surface normals to generate a 3D model of the object. The depth camera system may use cameras or projectors with different baseline distances to generate depth data. The use of different baseline distances may improve accuracy of the depth data. The data about surface normals may be calculated from images acquired when the object is illuminated from different angles. By using the depth data and relative depth changes from the surface normal data, high resolution spatial data may be generated at high frame rates. Data from multiple baseline distances may also be combined to improve performance.

25 Claims, 9 Drawing Sheets

3D MODELING WITH DEPTH CAMERA AND SURFACE NORMALS

BACKGROUND

A variety of applications including human-machine interfaces, augmented reality environments, gaming, and so forth may benefit from three-dimensional (3D) models of real-world objects. Existing 3D modeling techniques are computationally intensive or experience difficulties with low spatial resolution or complex equipment requirements.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
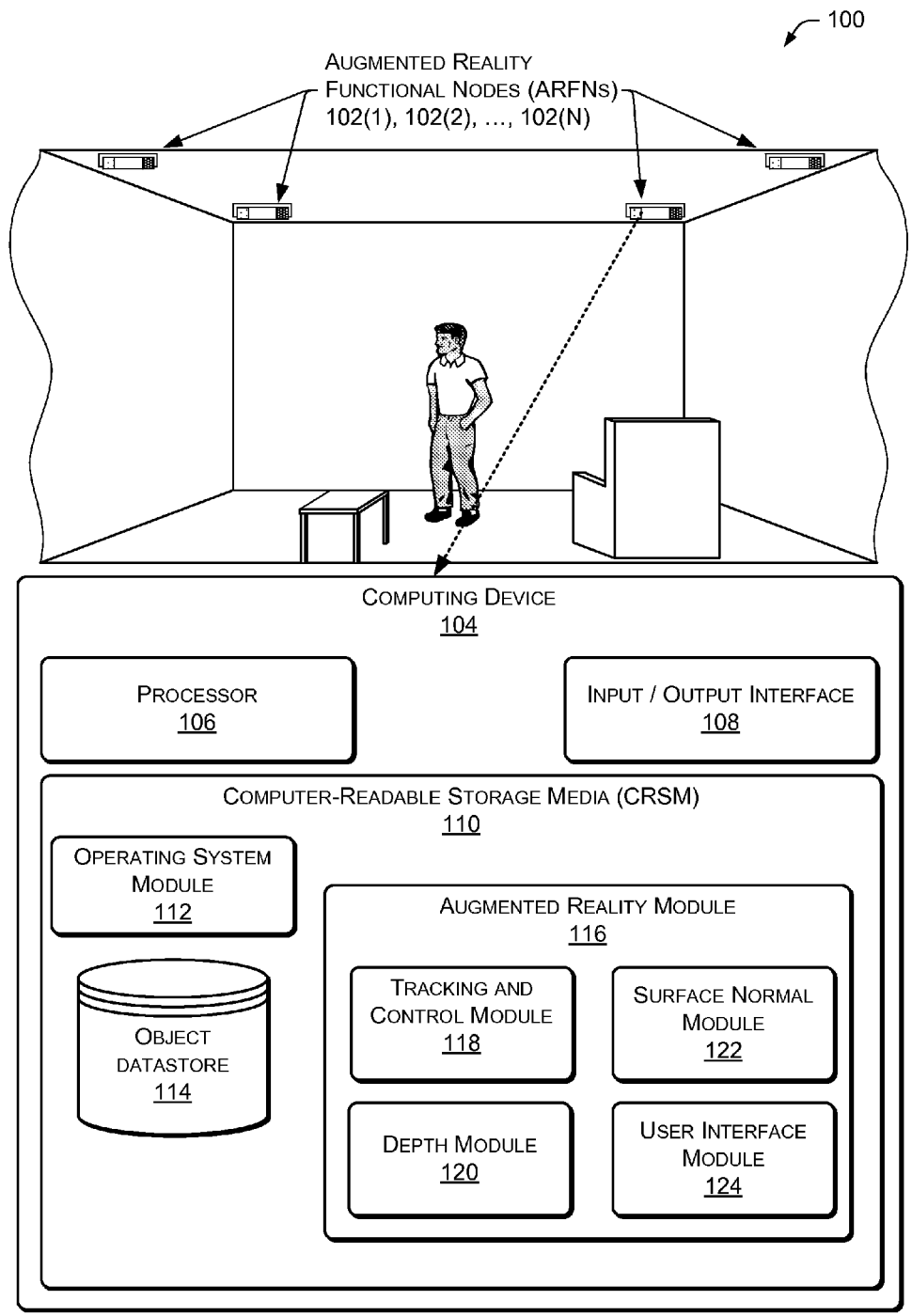
FIG. 1 shows an illustrative scene within an augmented reality environment which includes an augmented reality functional node having a depth module and a surface normal module.

Construction of three-dimensional models of real-world objects is useful in a variety of applications ranging from product quality control to input in augmented reality systems. Described herein are devices and techniques for efficiently generating three-dimensional (3D) models with high spatial resolution, as well as improving acquisition of depth data. Depth data from ranging cameras is used in conjunction with surface normal data acquired under varying illumination conditions to form a high spatial resolution 3D model of objects.

Ranging camera assemblies are configured to measure a distance from the assembly to at least a portion of an object. Ranging cameras may be active and use optical emitters such as in the case of structured light, light detection and ranging (LIDAR), optical time-of-flight, interferometry, and so forth. Ranging cameras may also use passive or non-emissive techniques such as stereoscopic imaging to determine a distance. These active and passive systems may be used either alone or in combination with one another to determine the distance to the object.

Ranging cameras may experience relatively low spatial resolution, particularly at distances beyond a few meters. For example, a structured light pattern as projected will typically spread out with distance, resulting in a coarser set of depth data being recovered. Similarly, as distances from the ranging camera increase, objects outside a usable range of a passive stereoscopic imaging system may be unmeasurable. While ranging cameras may result in low spatial resolution, they do provide the advantage of determining a precise measured distance to the object. In some implementations, the ranging cameras may acquire depth data from a first image and a second image by looking for a disparity between a first position of at least a portion of an object in the first image and a second position of the at least a portion of the object in the second image.

Surface normals of an object may be reconstructed by imaging the object under varying an angular relationship between a source of illumination and the camera acquiring the image. By changing the direction or angle from which the light is impinging on the object, the angle from which the object is imaged, or both, the changing luminance of portions of the object may be used to determine surface normals, or vectors which are perpendicular to the surface. For example, a first image of an object may be captured when the object is illuminated by a first light source having a first angular relationship with regards to the object, and a second image of the object may be captured when the object is illuminated by a second light source having a second angular relationship with regards to the object.

In some implementations, variations in radiance may also be used instead of or in addition to luminance to determine surface normals. These surface normals may be determined to a resolution of individual pixels, resulting in a high-spatial resolution map of an object. For example, photometric stereo techniques may be used to form a pixel-level mapping of surface contours. While surface normals may be used to determine relative changes in distance, such as when one portion of the object is closer or father away then another, measuring distances may be problematic in some situations. Surface reconstruction using surface normals is computationally intensive. Furthermore, reconstruction using only surface normals may fail, particularly in situations involving non-uniform illumination, projected shadows resulting from the object occluding light from a projector, and so forth.

As described herein, the lower spatial resolution depth data of the ranging camera which contains measured distance data is used in conjunction with the higher spatial resolution, but relative, surface normal data. When combined, the depth data provides a preliminary model of the surface shape of the object as measured, while the surface normal data fills in smaller features. In some implementations, this combination may reduce processing requirements while improving quality and speed of overall output. For example, a particular region of interest may be designated and the surface normal data may be generated for that region of interest, while surface normal data is not generated for areas outside the region of interest.

To further improve resolution, the ranging camera may alter the baseline, or linear distance between an optical emitter such as a projector in an active system and a camera. Likewise, the techniques described below may be applied to a passive system such as a stereoscopic system incorporating two or more cameras. Changes to the baseline may be accomplished by using a plurality or cameras, optical emitters, or a combination thereof. In some implementations cameras or optical emitters may be physically moved to alter the displacement. Where cameras of a plurality of cameras are present at different baseline distances, the output from these cameras may be combined to further improve overall accuracy. Changes to the baseline may be initiated to reduce noise levels in the determined distances, improve accuracy in determination of the distances, or to both reduce noise and improve accuracy.

Illustrative Environment

FIG. 1 shows an illustrative augmented reality environment 100 which includes one or more augmented reality functional nodes (ARFNs) 102(1), 102(2), . . . , 102(N) with associated computing devices. The ARFNs 102 may be configured to generate 3D models of objects within the room, such as users, furniture, pets, and so forth. In this illustration, multiple ARFNs 102(1)-(N) are positioned in the corners of the ceiling of the room. In other implementations, the ARFNs 102(1)-(N) may be positioned in other locations within the scene. When active, one such ARFN 102 may generate an augmented reality environment incorporating some or all of the items in the scene such as real-world objects. In some implementations, more or fewer ARFNs 102(1)-(N) may be used.

Each of the ARFNs 102(1)-(N) couples to or includes a computing device 104. This computing device 104 may be within the ARFN 102, or disposed at another location and connected to the ARFN 102. The computing device 104 comprises a processor 106, an input/output interface 108, and computer-readable storage media (CRSM) 110. The processor 106 may comprise one or more processors configured to execute instructions. The instructions may be stored in the CRSM 110, or in other CRSM or memory accessible to the processor 106.

The input/output interface 108 may be configured to couple the computing device 104 to other components such as projector, cameras, microphones, other ARFNs 102, other computing devices, other devices within the augmented reality environment, resources accessible via a network connection, and so forth. For example, the input/output interface 108 may be configured to exchange data with computing devices, cleaning robots, home automation devices, televisions, sound system, speakers, and so forth in the environment. The coupling between the computing device 104 and the devices may be via wire, fiber optic cable, or wireless connection including but not limited to radio frequency, optical, or acoustic signals.

The CRSM 110 may be any available physical media accessible by a computing device to implement the instructions stored thereon or store data within. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the CRSM 110 and configured to execute on a processor, such as the processor 106. Modules may be stored in the memory of the ARFN 102, storage devices accessible on the local network, cloud storage accessible via a wide area network, or distributed across a combination thereof. An operating system module 112 is configured to manage hardware and services within and coupled to the computing device 104 for the benefit of other modules.

An object datastore 114 is configured to maintain information about objects within or accessible to the augmented reality environment or users. These objects may be tangible real world objects or virtual objects. Physical or tangible objects include items such as tables, chairs, animals, plants, food containers, printed books, and so forth. Data about these objects may include 3D models of the objects. Virtual objects include media content such as songs, movies, electronic books, computer generated scenes, media files, and so forth. Virtual objects may include stored copies of those objects or access rights thereto. The object datastore 114 may include a library of pre-loaded reference objects, as well as objects which are temporally persistent within a particular environment, such as a wall, a specific table, a user and so forth.

The object datastore 114 may be stored on one or more of the memory of the ARFN 102, storage devices accessible on the local network, cloud storage accessible via a wide area network, or distributed across one or more of these.

An augmented reality module 116 is configured to generate augmented reality output in concert with the physical environment. The module 116 may access one or more of the datastores described herein. The augmented reality module 116 may include a tracking and control module 118 configured to track objects or portions thereof, control input and output devices, and control one or more devices. The tracking and control module 118 may also be configured to identify objects, including users.

The augmented reality module 116 may incorporate a depth module 120. The depth module 120 is configured to use data acquired from the ranging camera assembly to determine depth data comprising measured distances to one or more objects. A surface normal module 122 is configured to use images where the angle between an illumination source and camera vary to reconstruct surface normals. In some implementations, a ratio of luminance from two or more different angles for a given area may be used to determine the surface normals. The angle between the illumination source and camera 210 may vary due to changes in activation of one of a plurality of illumination sources, due to movement of the camera, due to use of different cameras, and so forth. For example, this module 122 may utilize photometric stereo techniques. In some implementations, the surface normal module 124 may assume that the object posses a Lambertian reflectance. Lambertian reflectance assumes that the surface luminance is isotropic. In other implementations, other surface assumptions may be used. The augmented reality module 116 may then use this depth data and the surface normal data to generate a 3D model of the object.

The surface normal module 122 may be configured in some implementations to determine if a Lambertian surface is present. For example, a Lambertian surface may be detected by showing substantially equal radiance at different points-of-view, in contrast to non-Lambertian surfaces which show variances in radiance depending upon the point-of-view.

A user interface module 124 which may be in the augmented reality module 116 is configured to accept and interpret input and generate output for the user. The ARFN 102 may use the 3D model as generated with data from cameras, optical emitters, and so forth to read the input from the user. The user interface module 124 may also include an object datastore query module configured to allow applications to access information in the object datastore 114.

Figure 2:
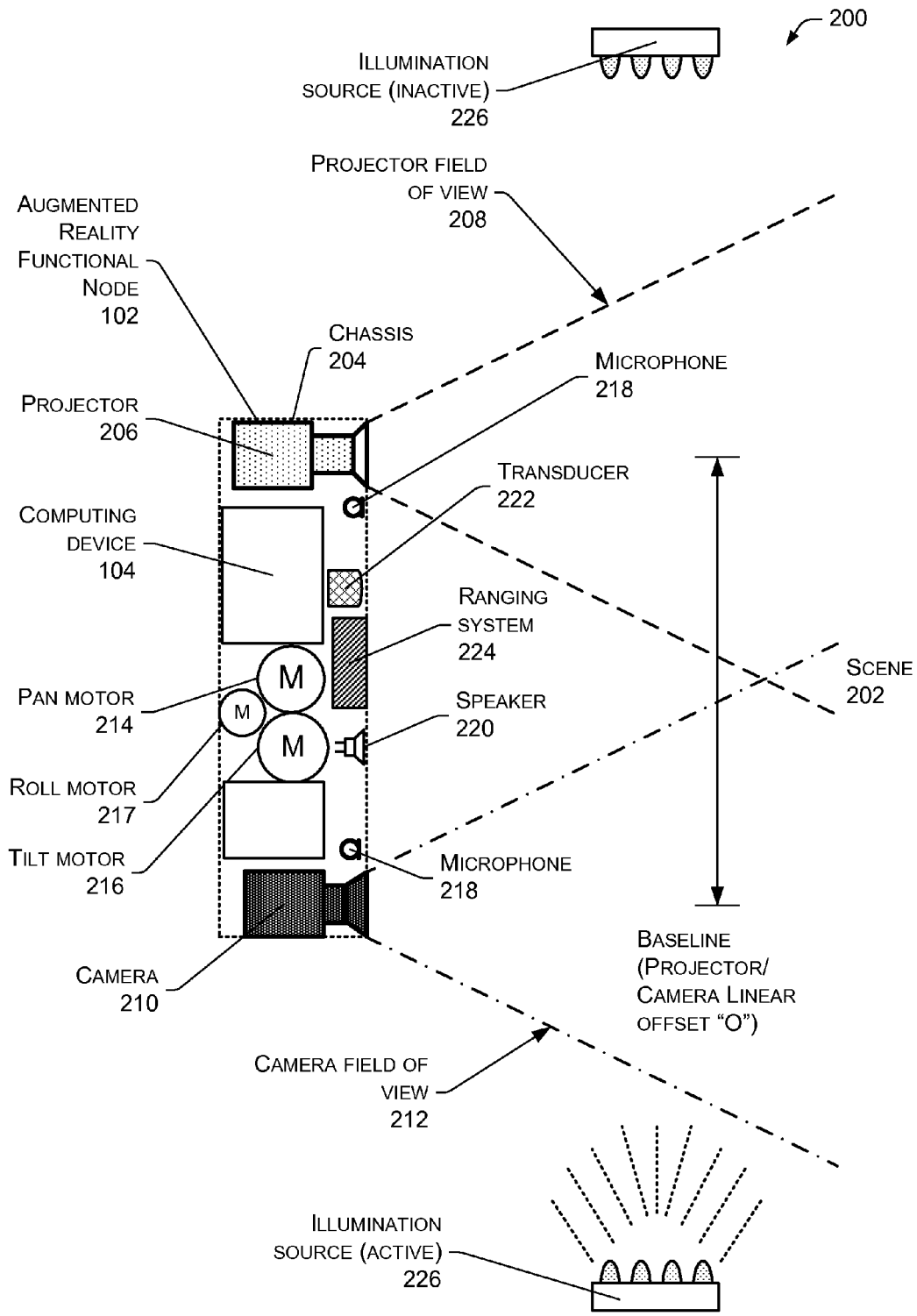
FIG. 2 shows an illustrative augmented reality functional node that includes a computing device, along with other selected components configured to generate and maintain an augmented reality environment and generate a 3D model of one or more objects.

FIG. 2 shows an illustrative schematic 200 of one example augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may include structured light patterns, optical signals for time-of-flight calculation, and so forth. These images may be visible light images perceptible to the user, visible light images imperceptible to the user, images with non-visible light, or a combination thereof. For example, visible light images may be imperceptible to the user because a projection duration for the images are less than the integration time of the user's eye. Non-visible light may include ultraviolet light, infrared light, and so forth. The images may be variable over time such as a series of different frames in a moving image, or fixed such as in the case of a slide projector. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, slide, holographic film, light emitting diode, and so forth. For example, the projector 206 may comprise a light emitting diode configured to provide a particular speckle pattern suitable for use as a structured light pattern. The projector 206 may be further configured to pan, tilt, or rotate independently of the chassis 204. One or more actuators may be coupled to the projector. The actuators may be configured to pan, tilt, roll, or a combination thereof the projector 206 about one or more axes.

The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, the range camera assembly may comprise a plurality of projectors 206, other optical emitters, and so forth.

At least one camera 210 may also be disposed within the chassis 204. The camera 210 is configured to image the scene in visible light wavelengths, non-visible light wavelengths, or both. For example, in one implementation the camera 210 may be configured to generate a thermal image as well as a visible light image. The camera 210 may be part of the ranging camera assembly, and be configured to acquire ranging signals, such as the projected structured light pattern. In the implementation depicted here, the camera 210 also acquires image data under varying illumination for the determination of the surface normals. In other implementations, a separate camera 210 may be used to acquire the image data for the determination of the surface normals. The camera 210 may be further configured to pan, tilt, or rotate independently of the chassis 204. One or more actuators coupled to the cameras 210 either individually or jointly. The actuators may be configured to pan, tilt, roll, or a combination thereof each of the cameras independently of one another and about one or more different axes.

The camera 210 has a camera field of view 212 which describes a particular solid angle originating at a particular point-of-view. The camera field of view 212 may vary according to changes in the configuration of the camera 210. For example, an optical zoom of the camera may narrow the camera field of view 212. In some implementations, such as described below, a plurality of cameras 210 may be used. These cameras 210 may be dedicated for use as part of the ranging camera assembly, used for acquisition of images for surface normal determination, or used for both ranging and surface normal image acquisition.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, a roll motor 217, and so forth. The pan motor 214 is configured to rotate the chassis 204 in a yawing motion. The tilt motor 216 is configured to change the pitch of the chassis 204. The roll motor 217 is configured to rotate the chassis 204 in a rolling motion.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival or other techniques among the microphones.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. For example, the transducer 222 may be configured to detect a characteristic ultrasonic sound signature produced by keys on a keyring. Inaudible signals may also be used to provide for signaling between accessory devices and the ARFN 102.

Another ranging system 224 may also be provided in the ARFN 102. The ranging system 224 is configured to provide distance information from the ARFN 102 to a scanned object or set of objects. The ranging system 224 may comprise radar, ultrasonic ranging, and so forth. In some implementations the transducer 222, the microphones 218, the speaker 220, or a combination thereof may be configured to use echolocation or echo-ranging to determine distance and characteristics of objects in the scene 202.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a baseline or projector/camera linear offset designated "O". This is a linear distance between the projector 206 and the camera 210. Placement of the projector 206 and the camera 210 at the baseline distance "O" from one another may aid in the recovery of depth information about objects in the scene 202. The known baseline projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary. These variations may also be used at least in part to determine distance, dimensions, and so forth.

Illumination sources 226 are disposed around the scene 202. In some implementations one or more of these illumination sources may be incorporated into or coupled directly to the chassis 204. The illumination sources 226 are configured to be selectively activated at particular times to allow for imaging the object with the camera 210 under varying known illumination states. The illumination sources 226 may comprise light emitting diodes, incandescent lights, fluorescent lights, electroluminescent lights, and so forth.

The illumination sources 226 may also be configured to generate different wavelengths of light. These wavelengths may be visible, non-visible such as infrared and ultraviolet, or a combination thereof. In some implementations, a plurality of different illumination sources 226 may be active at substantially the same time, each emitting light of a different wavelength. As described herein, the ranging camera assembly or a separate imaging camera is configured to selectively acquire images at particular wavelengths of light while a plurality of illumination sources are each disposed at the plurality of illumination angles and each configured to generate a different particular wavelength of light. This, in effect, multiplexes the illumination state allowing recovery of the same image of the scene 202 in different wavelengths at substantially the same time. In another implementation, illumination may be provided by a single light source in multiple wavelengths but acquired from different cameras, each configured to generate an image in one of the different particular wavelengths of light.

The illumination sources 226 may also be configured to move or direct their emitted light to particular locations. For example, the illumination sources 226 may be configured by the augmented reality module 116 to focus illumination on a user's face or hands.

In some implementations, overhead or room lighting may be used as illumination sources 226. For example, the ARFN 102 may be coupled to and configured to direct illumination state of an overhead light comprising light emitting diodes.

In some implementations where the range camera assembly uses an active optical signal, the active optical signal may use a first wavelength while the illumination sources 226 and the camera 210 recovering image data for determination of surface normals operate at one or more different wavelengths. In this way, data for distance measurement and surface normals may be acquired at the same or overlapping times without interference to one another.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

In some implementations, one or more of the illumination sources 226 may be configured to move relative to the object in the scene 202. For example, a linear array of light emitting diodes may be mounted on a track on a wall and configured to move along the track, altering the angle of illumination.

Figure 3:
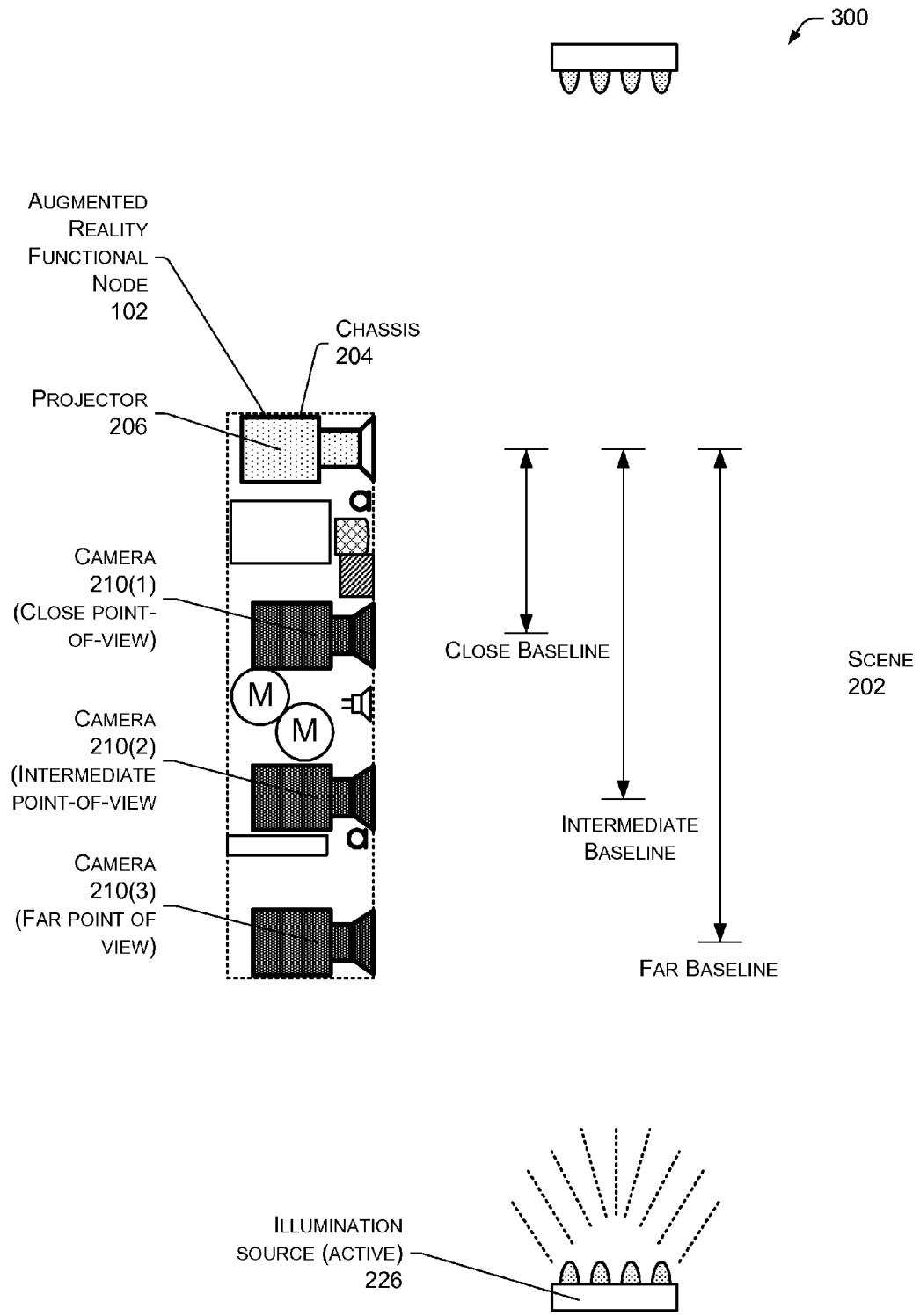
FIG. 3 shows an illustrative augmented reality functional node which incorporates a plurality of range cameras each with a different baseline distance relative to a projector.

FIG. 3 shows an illustrative augmented reality functional node 300 which incorporates a plurality of ranging cameras, each with a different baseline distance relative to a projector. The ranging cameras 210 are part of the ranging camera assembly and are used to measure a distance to the object in the scene 202. Different baseline lengths are better suited for use at different distance ranges to the object. For example, for very close objects within a meter or less from the chassis 204, a close baseline of about 5 centimeters may allow for accurate measurement. However, this close baseline may not be able to accurately measure distances to objects beyond one meter.

A plurality of cameras may be disposed to provide different baseline lengths. In the implementation depicted here, three cameras 210(1), 210(2), and 210(3) are part of the ranging camera assembly, and are disposed at three different linear distances or baselines relative to the projector 206. The first camera 210(1) is has a close baseline suited for near objects, while the second camera 210(2) has an intermediate baseline suited for midrange objects, and the third camera 210(3) has a far baseline suited for objects distant objects beyond the midrange. The projector 206, the cameras 210, or a combination thereof may also be configured in some implementations to pan, tilt, or roll individually. For example, the camera 210(3) may be panned to bring an object in the scene 202 which is in front of the projector 206 into the frame of the acquired image. The pan, tilt, or roll may be manually set, or may be variable such as using a motor, actuator, and so forth.

In another implementation (not shown here) utilizing a passive ranging camera system such as stereoscopy to determine distance, the baseline may be measured between cameras, such as from one camera 210(1) to another camera 210(2). The various different baselines may be implemented to provide similar improvements to acquisition of stereoscopy data.

In yet another implementation, a single camera may be used in conjunction with multiple optical emitters such as projectors 206 disposed at different baseline distances. In this implementation, the single camera may recover information such as a portion of structured light patterns projected by different projectors onto the object within the scene 202.

In some implementations, a single camera or multiple cameras may be configured with one or more prisms, mirrors, or other optically directive elements configured to change the point-of-view of the camera. For example, a lateral periscope arrangement may be used to selectively change the baseline of the camera. Likewise, optically directive elements may be used to displace the optical signals such as emitted by the projector 206 to change the baseline distance.

The multiple different baselines may also be used to acquire images using different illumination angles for determination of surface normals. For example, the illumination source 226 may remain the same, while the camera used to image the scene 202 varies. In this implementation, a single illumination source in conjunction with multiple cameras may be used to gather the images of the scene 202 under different apparent illumination states as imaged by the multiple cameras.

Figure 4:
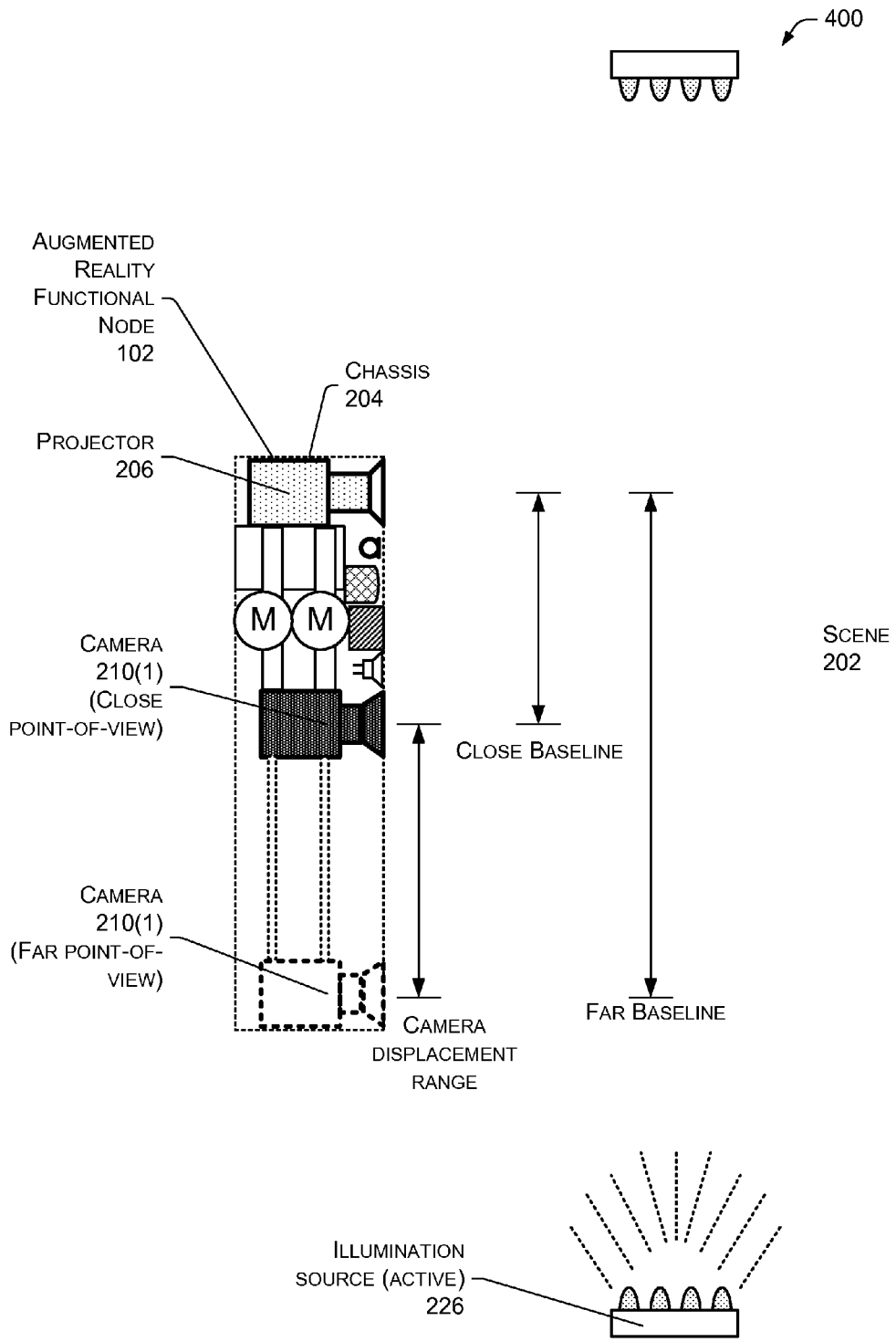
FIG. 4 shows an illustrative augmented reality functional node which incorporates a moveable range camera configured to provide a variable baseline distance relative to a projector.

FIG. 4 shows an illustrative augmented reality functional node 400 which incorporates a moveable camera 210. As shown here, the camera 210(1) may be configured to be physically displaced to provide a variable baseline distance relative to the projector 206 or another camera 210. As shown here, the camera 210 may move between a close point-of-view which is proximate to the projector 206 and a far point of view which is distal to the projector 206. A camera displacement range describes the extent of this movement. Various mechanisms may be used to displace the camera including rotary motors, linear motors, solenoids, pneumatic actuators, hydraulic actuators, piezoelectric actuators, and so forth.

Illustrative Processes

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on one or more other devices as well as one or more different architectures.

Figure 5:
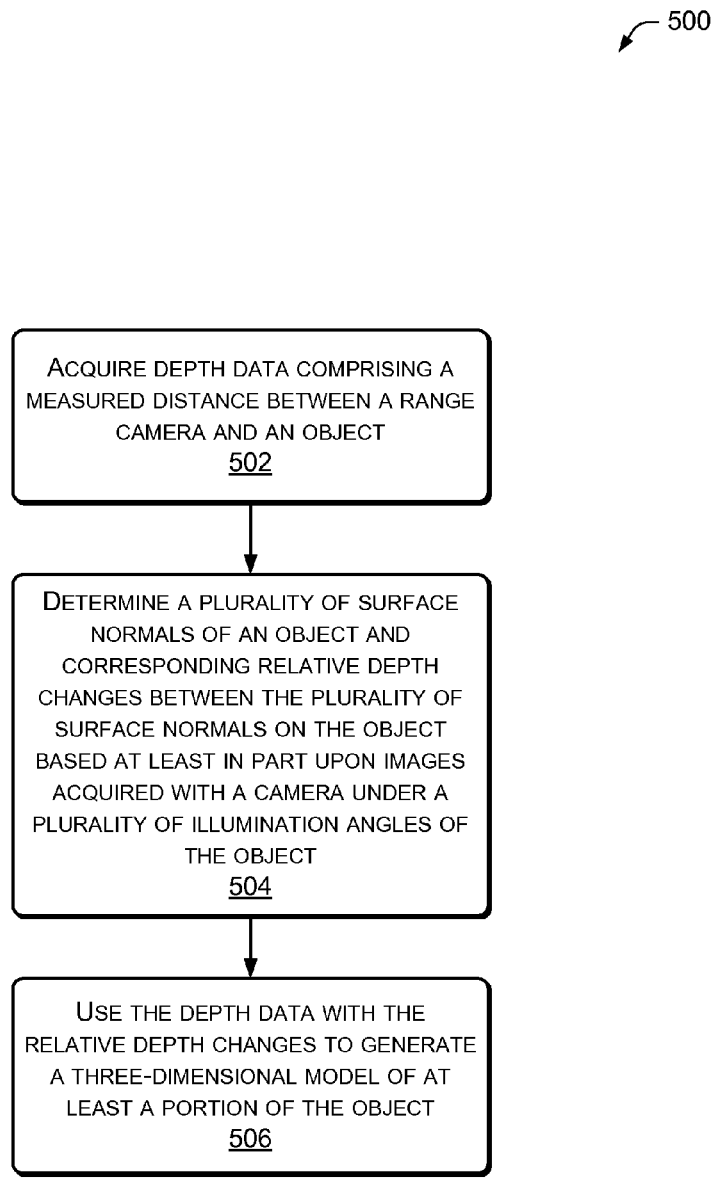
FIG. 5 is an illustrative process of generating a 3D model of an object using depth data from a range camera and surface normals derived photometrically.

FIG. 5 is an illustrative process 500 of generating a 3D model of an object using depth data from a range camera and surface normals derived photometrically. In some implementations, the augmented reality module 116 may be configured to perform the following operations.

At 502, depth data comprising the measured distance between the range camera or another designated origin and at least a portion of the object is acquired from the range camera assembly. As described above, the range camera assembly may use active or passive modes to determine the distance to objects in the scene 202.

At 504, a plurality of surface normals of an object and corresponding relative depth changes between the plurality of surface normals of the object which are adjacent to one another are determined. This determination is based at least in part upon the images as acquired under a plurality of illumination angles of the object. For example, as described above the camera 210 may acquire images when different illumination sources 226 disposed around the scene 202 are active, where each image is acquired during a different illumination state. As described above, in some implementations an individual surface normal may be generated for each pixel of the first image, the second image or both, resulting in a relative depth data with high spatial resolution.

In some implementations, the augmented reality module 116 may be configured to initiate the variation in the illumination angle of the object by triggering illumination of a plurality of illumination sources 226 where each illumination source is disposed at a different angular position relative to the object. For example, one illumination source 226 overhead, another to the left, another to the right, and so forth.

At 506, the depth data is used in conjunction with relative depth changes between the determined plurality of surface normals to generate a three-dimensional model of at least a portion of the object. This use may involve using the depth data as a preliminary or "rough" topological model upon which the surface normal data is merged to improve the spatial resolution. Use of the depth data as a preliminary model, improves computational efficiency by reducing the set of possible topologies to be considered and calculated.

Figure 6:
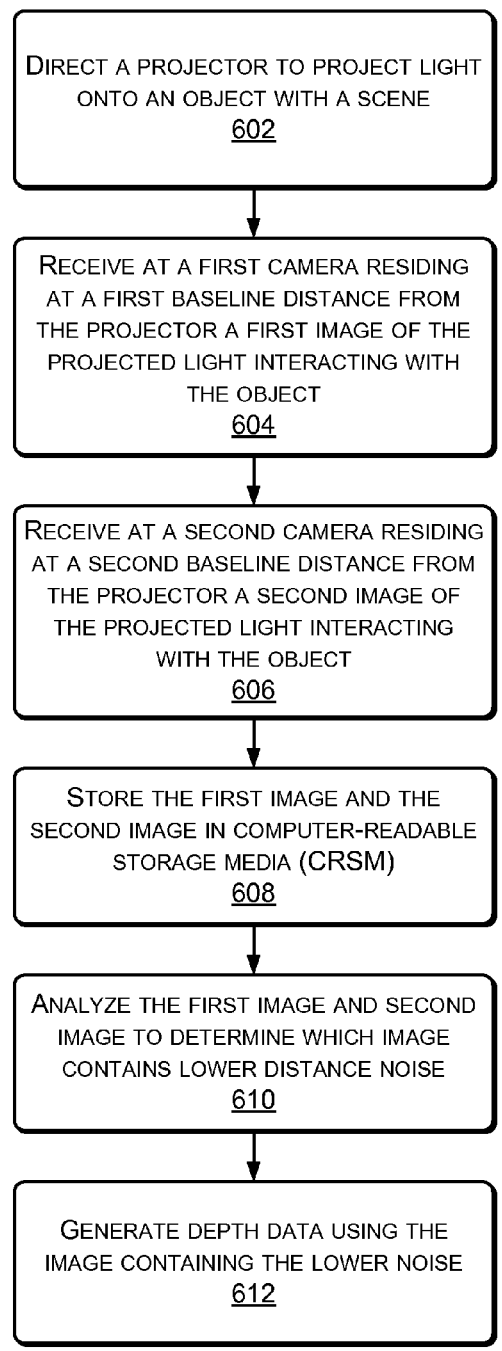
FIG. 6 is an illustrative process of selecting one of a plurality of range cameras at different baseline lengths to lower noise, improve accuracy, or both in a measured distance.

FIG. 6 is an illustrative process 600 of selecting one of a plurality of range cameras at different baseline lengths to lower noise in a measured distance, improve accuracy of the depth resolution distance, or both. The following operations may be performed in some implementations by the augmented reality module 116.

At 602, a projector is directed to project light onto an object within a scene. This projected light may be suitable for acquiring distance data from an object. For example, an optical emitter may provide an optical pulse suitable for time-of-flight determinations, or a structured light pattern may be projected on objects in the scene. In other implementations where the range camera system is passive, this element may be omitted.

At 604, a first camera residing at a first baseline distance from the projector receives a first image of the projected light interacting with the object. For example, the image of the object with the structured light pattern superimposed and distorted due to the surface topography of the object.

At 606, a second camera residing at a second baseline distance from the projector receives a second image of the projected light interacting with the object. Because the first and second baselines are different, one of the images may include more uncertainty in calculated distances and thus be considered noisier.

At 608, the first image and the second image are stored in the computer-readable storage media or in another computer-readable storage media. This storage media may include video camera buffer memory, system memory, and so forth.

At 610, the first image and the second image as stored in the CRSM are analyzed to determine which image contains lower distance noise. Distance noise as used herein is the variation in calculated distance resulting from uncertainties in the data. A distance noise metric may be used to quantify the distance noise present in the data, and allow for comparisons between two or more images. For example, data with a relatively high distance noise metric is data in which the calculated distance has a larger error range than "cleaner" data with a relatively lower distance noise metric.

Instead of or in addition to the noise analysis, in some implementations, the first image and the second image as stored in the CRSM may be analyzed for accuracy. The images may be analyzed to determine which provides more accurate distance data.

At 612, depth data using the image containing the lower noise is generated. In some implementations, such as described next with regards to FIG. 7, the data may be combined to improve overall accuracy.

Figure 7:
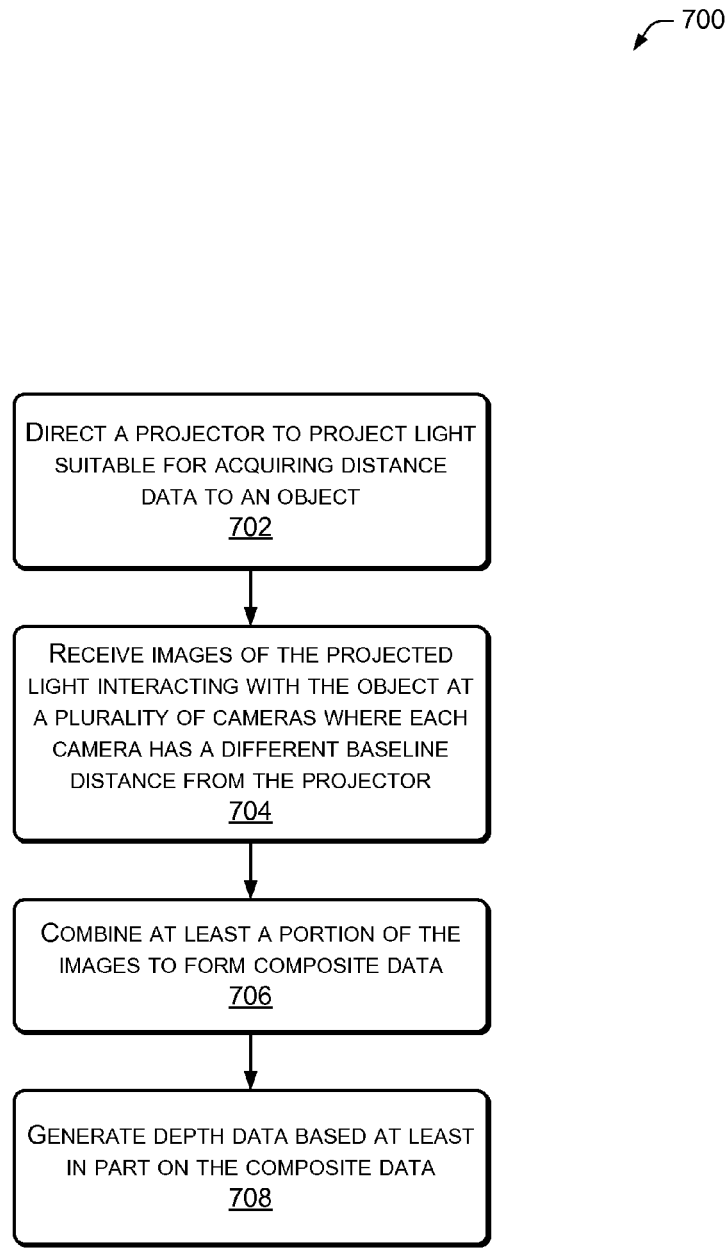
FIG. 7 is an illustrative process of generating depth data from a plurality of range cameras positioned at different baseline distances.

FIG. 7 is an illustrative process 700 of generating depth data from a plurality of range cameras positioned at different baseline distances. As above, the following operations may be performed in some implementations by the augmented reality module 116.

At 702, a projector or other optical emitter in an active system is directed to project light suitable for acquiring distance data from an object. For example, an optical emitter may provide an optical pulse suitable for time-of-flight determinations, or a structured light pattern may be projected on objects in the scene. In other implementations where the range camera system is passive, this element may be omitted.

At 704, images of the projected light interacting with the object (or of the object itself in a passive system) are received at a plurality of cameras where each camera has a different baseline distance from the projector (or a given camera). These images may be acquired at substantially the same time, resulting in several different simultaneous views of the object.

At 706, at least a portion of the first and second images may be combined to form composite data. Due to the different baselines, the composite data may have different amounts of distance noise, accuracy, and so forth. However, when combined, the overall noise in the composite data may be significantly reduced, accuracy improved, and so forth. The combination of data from different baselines may use various analytical, statistical, or data compilation techniques.

At 708, depth data based at least in part on the composite data is generated. Because the overall composite data may experience reduced overall noise, the resulting depth data may experience improved accuracy in the measured distances.

Figure 8:
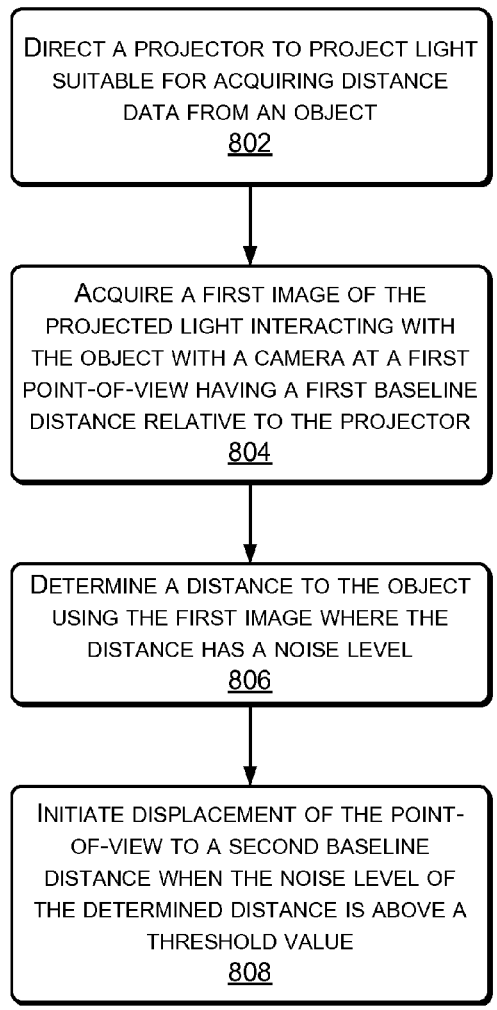
FIG. 8 is an illustrative process of altering a point-of-view of a range camera to lower noise, improve accuracy, or both in a measured distance.

FIG. 8 is an illustrative process 800 of altering a point-of-view of a range camera to lower noise in a measured distance. As above, the following operations may be performed in some implementations by the augmented reality module 116. As described above with regards to FIG. 4, the position of the camera 210, projector 206, or the optical path for one or both may be physically displaced. For example, the camera 210 may move, an optical path may be altered, and so forth which changes the baseline.

At 802, a projector or other optical emitter in an active system is directed to project light at a first exit point suitable for acquiring distance data from an object. The exit point may be an aperture, lens, mirror, or other component from which the projected light emanates from the projector or an associated optical subsystem. For example, an optical emitter may provide an optical pulse suitable for time-of-flight determinations, or a structured light pattern may be projected on objects in the scene. In other implementations where the range camera system is passive, this element may be omitted.

At 804, a first image of the projected light interacting with the object is acquired with the camera at a first baseline distance measured between the first exit point of the projected light and a first point-of-view of the camera.

At 806, a distance to the object is determined using the first image, where the distance has a noise level. At 808, change in the baseline distance is initiated when the noise level of the determined distance is above a threshold value. For example, the first image of a distant object may be acquired with a relatively short baseline distance, resulting in significant noise. In response, the baseline distance may be increased and a second image acquired at the new baseline distance.

As mentioned above, the change in the baseline distance may comprise redirecting incident light to the camera via a mirror, a prism, or both, which in turn alters the point-of-view of the camera. Similarly, the change in the baseline distance may comprise a physical displacement of the camera relative to the projector.

As also mentioned above, to change the baseline distance the exit point of light from the projector in an active system may be moved. Thus, the change in the baseline distance may comprise redirecting the projected light via a mirror, a prism, or both to a second exit point having a second baseline distance. Similarly, the change in the baseline distance may comprise a physical displacement of the projector relative to the camera.

In some implementations changes to the light path and physical position of the projector, camera, or both may be used. For example, the camera may be configured to have a second point of view resulting from optical redirection which is +10 cm relative to the camera default point-of-view while the projector is configured to move to a position −30 cm relative to the camera. As a result of combining these, the baseline is increased to 40 cm.

Figure 9:
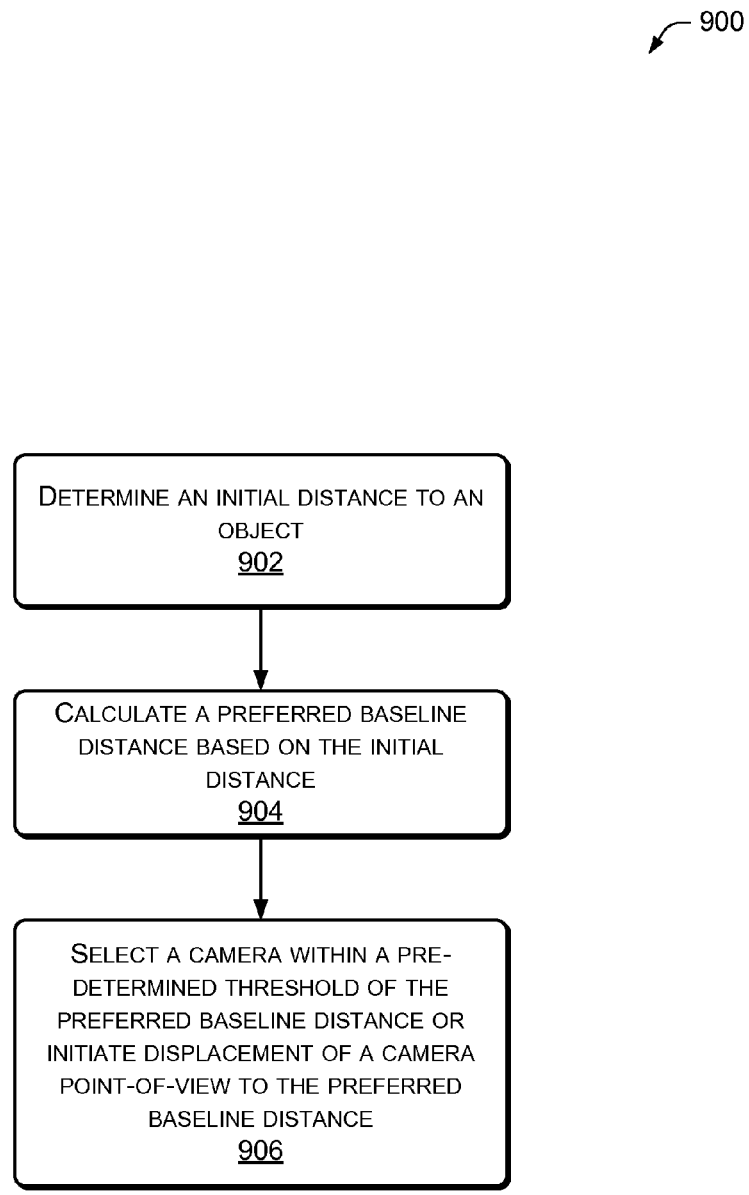
FIG. 9 is an illustrative process of selecting or initiating displacement to a preferred baseline distance.

FIG. 9 is an illustrative process 900 of selecting or initiating displacement to a preferred baseline distance. At 902, an initial distance to an object in the scene 202 is determined. This initial distance may be determined optically, acoustically, and so forth. For example, in one implementation, the initial distance may be acquired by directing the projector 206 to project light and using an acquiring an image of the projected light to determine the distance such as described above. In another example, acoustic time difference arrival techniques may be used to generate the initial distance to the object based on sounds emitted from or reflected by the object.

At 904, a preferred baseline distance is calculated based on the initial distance. This preferred baseline distance may be calculated using one or more parameters such as the projector field of view 208, the camera field of view 212, available baseline distances or range of distances, orientation of the projector 206, orientation of the camera 210, desired accuracy, minimum acceptable distance noise, and so forth. For example, given a distance to an object of 2 meters, a minimum acceptable noise level of plus or minus 1 cm, and the fields of view, the preferred baseline distance may be calculated as 32 cm. In some implementations the preferred baseline distance may be determined using a lookup table, or a lookup table in combination with calculation. In some implementations the preferred baseline distance may be pre-determined as a maximum possible baseline as constrained by the projector field of view 208 and the camera field of view 212 such that the object is visible to both.

At 906, the camera 210 within a pre-determined threshold of the preferred baseline distance may be selected, or displacement of the point-of-view to the preferred baseline distance may be initiated. Where the cameras 210 are located at fixed intervals, such as described above with regards to FIG. 3, the pre-determined threshold may be configured to snap to the camera having the next lowest baseline. For example, when the preferred baseline is 32 cm, and the cameras are disposed at 8 cm, 25 cm, and 50 cm, the 25 cm baseline may be selected, thus using images from the camera 210(2). Where the camera 210 is displaceable, such as described above with regards to FIG. 4, the point-of-view of the camera 210(1) may be moved to the preferred baseline distance, or proximate thereto. Continuing the example above, when the preferred baseline distance is determined to be 55 cm, the point-of-view may be displaced to the largest available baseline of 50 cm.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
   one or more processors;
   a range camera assembly coupled to the one or more processors and configured to capture a first image of an object and a second image of the object wherein the first image of the object is captured when the object is illuminated by a first light source having a first angular relationship with regards to the object and the second image of the object is captured when the object is illuminated by a second light source having a second angular relationship with regards to the object and acquire depth data from the captured images;
   one or more computer-readable media storing instructions that, when executed by the one or more processors, cause the one or more processors to perform acts comprising:
   generate distance data indicating a distance between the object and a portion of the range camera assembly based at least in part on the acquired depth data;

determine a plurality of surface normals of the object, the surface normals of the object being based at least in part upon the first image of the object and the second image of the object;

determine, for a first surface normal of the plurality of surface normals, first relative depth changes between the first surface normal and one or more first adjacent ones of the plurality of surface normals of the object based on the plurality of surface normals;

determine, for a second surface normal of the plurality of surface normals, second relative depth changes between the second surface normal and one or more second adjacent ones of the plurality of surface normals of the object based on the plurality of surface normals;

generate preliminary model information of a three-dimensional model of at least a portion of the object at least in part by utilizing the distance data; and improve, at least in part by utilizing the first relative depth changes and the second relative depth changes, the spatial resolution of the preliminary model information to generate the three dimensional model.

2. The system of claim 1, wherein a surface normal is determined for each pixel in the first image, the second image, or both the first image and the second image.

3. The system of claim 1, wherein the range camera assembly is configured to selectively acquire images at particular wavelengths of light, and the first light source and the second light source are configured to generate different particular wavelengths of light.

4. The system of claim 1, further comprising an imaging camera configured to selectively acquire images at particular wavelengths of light, and the first light source and the second light source are configured to generate different particular wavelengths of light.

5. The system of claim 1, wherein at least a portion of one or more of the first light source and the second light source are configured to move relative to the object.

6. The system of claim 1, wherein the range camera assembly comprises a plurality of optical emitters configured to generate an optical signal and one or more imaging devices configured to receive at least a portion of the optical signal.

7. The system of claim 1, wherein the range camera assembly comprises a structured light projector configured to generate a structured light signal and one or more imaging devices configured to acquire the structured light signal after interaction with the object.

8. The system of claim 1, wherein the range camera assembly comprises an optical emitter configured to generate an optical signal and one or more imaging devices configured to acquire the optical signal and determine a time-of-flight of the optical signal.

9. The system of claim 1, wherein the range camera assembly comprises a plurality of imaging devices each disposed at different distances relative to an optical emitter or projector.

10. The system of claim 1, wherein the range camera assembly comprises one or more imaging devices configured to move relative to an optical emitter or projector such that a baseline distance between the one or more imaging devices and the optical emitter or projector is varied.

11. The system of claim 1, wherein the range camera assembly comprises two or more cameras configured to stereoscopically acquire depth data between the object and the range camera, or a portion thereof.

12. One or more non-transitory computer-readable storage media storing instructions that, when executed by one or more processors, cause the one or more processors to perform acts comprising:

directing a projector to project light onto an object within an environment;

receiving, at a first camera residing at a first baseline distance from the projector, a first image of a scene including the object onto which the light is projected;

receiving, at a second, different camera residing at a second, different baseline distance from the projector, a second image of the scene including the object onto which the light is projected;

storing the first image and the second image;

determining that the first image has a lower distance noise metric than the second image; and in response to determining that the first image has a lower distance noise metric than the second image, generating, using the first image, depth data describing a distance to at least a portion of the object.

13. The one or more non-transitory computer-readable storage media of claim 12, the acts further comprising:

determining a plurality of surface normals of the object and corresponding relative depth changes between the plurality of surface normals based at least in part upon images acquired by the first camera, the second camera, a third, different camera, or a combination thereof; and using the depth data and the relative depth changes there between to generate a three-dimensional model of at least a portion of the object.

14. The one or more non-transitory computer-readable storage media of claim 12, the acts further comprising:

using at least a portion of the first and second images to form composite data; and generating depth data comprising one or more distances to the object based at least in part on the composite data.

15. A system comprising:

one or more processors;

a range camera assembly coupled to the one or more processors and configured to acquire depth data of an object;

a two or more cameras coupled to the one or more processors which are disposed at different linear distances relative to one another and configured to capture a first image of the object at a first point-of-view having a first angular relationship with regards to the object and a second image of the object at a second point-of-view having a second angular relationship with regards to the object as illuminated by a light source;

one or more computer-readable media storing instructions that, when executed by the one or more processors, cause the one or more processors to perform acts comprising:

generate distance data indicating a distance between the object and a portion of the range camera assembly based at least in part on the acquired depth data;

determine a plurality of surface normals of the object, the surface normals of the object being based at least in part upon the first image and second image;

determine, for a first surface normal of the plurality of surface normals, first relative depth changes between the first surface normal and one or more first adjacent ones of the plurality of surface normals of the object based on the plurality of surface normals;

determine, for a second surface normal of the plurality of surface normals, second relative depth changes between the second surface normal and one or more second adjacent ones of the plurality of surface normals of the object based on the plurality of surface normals;

generate preliminary model information of a three-dimensional model of at least a portion of the object at least in part by utilizing the distance data; and improve, at least in part by utilizing the first relative depth changes and the second relative depth changes, the spatial resolution of the preliminary model information to generate the three dimensional model.

16. The system of claim 15, further comprising one or more actuators coupled to the two or more cameras, the actuators configured to pan, tilt, roll, or a combination thereof the two or more cameras independently.

17. One or more non-transitory computer-readable storage media storing instructions that, when executed by one or more processors, cause the one or more processors to perform acts comprising:

directing a projector to project light onto an object;

acquiring, with a camera residing a baseline distance from the projector, an image of the object having the light projected thereon;

determining, using the image, a distance to the object and a noise level metric of the distance;

determining whether the noise level metric of the distance is above a threshold value; and changing the baseline distance at least partly in response to determining that the noise level metric is above the threshold value.

18. The one or more non-transitory computer-readable storage media of claim 17, wherein changing the baseline distance comprises redirecting incident light to the camera via a mirror, a prism, or both, or altering a point-of-view of the camera.

19. The one or more non-transitory computer-readable storage media of claim 17, wherein changing the baseline distance comprises physically displacing the camera relative to the projector.

20. The one or more non-transitory computer-readable storage media of claim 17, wherein changing the baseline distance comprises redirecting the projected light via a mirror, a prism, or both.

21. The one or more non-transitory computer-readable storage media of claim 17, wherein changing the baseline distance comprises physically displacing the projector relative to the camera.

22. One or more non-transitory computer-readable storage media storing instructions that, when executed by one or more processors, cause the one or more processors to perform acts comprising:

determining an initial distance to an object;

calculating a preferred baseline distance based on the initial distance; and selecting, when a plurality of cameras at fixed baselines are available, a camera of the plurality of available cameras within a pre-determined threshold distance of the preferred baseline distance or, when a moveable camera is available, initiating displacement of a camera point-of-view of the moveable camera to proximate to the preferred baseline distance to change a baseline distance of the moveable camera.

23. The one or more non-transitory computer-readable storage media of claim 22, the determining the initial distance comprising acoustically locating the object.

24. The one or more non-transitory computer-readable storage media of claim 22, wherein changing the baseline distance comprises redirecting incident light to the camera via a mirror, a prism, or both, or altering a point-of-view of the camera.

25. The one or more non-transitory computer-readable storage media of claim 22, wherein the baseline distance of the moveable camera comprises a linear distance between the moveable camera and a projector.

* * * * *